United States Patent [19]

Fisk

[11] 4,103,852

[45] Aug. 1, 1978

[54] ADJUSTABLE INSTRUMENT MOUNTING BRACKET

[76] Inventor: James C. Fisk, G-3219 E. Bristol, Burton, Mich. 48529

[21] Appl. No.: 704,231

[22] Filed: Jul. 12, 1976

[51] Int. Cl.² ............................................. F16M 11/04
[52] U.S. Cl. .................................. 248/178; 248/316 C
[58] Field of Search ............ 248/346, 178, 185, 226 R, 248/226.3, 226.4, 316 R, 316 C, 316 D; 24/259 PR, 259 C, 137 R, 255 TC

[56] References Cited

U.S. PATENT DOCUMENTS

| 496,573 | 5/1893 | Leyner | 248/226.3 |
| 2,151,768 | 3/1939 | Humeston | 248/316 R |
| 2,541,828 | 2/1951 | Peck | 248/316 D |
| 2,929,166 | 3/1960 | Sneide | 24/259 R |
| 3,032,309 | 5/1962 | Smith | 248/346 |
| 3,162,965 | 12/1964 | Snediker | 248/298 |
| 3,429,543 | 2/1969 | Mooney | 248/346 |

*Primary Examiner*—Robert A. Hafer
*Attorney, Agent, or Firm*—Burton, Parker & Schramm

[57] ABSTRACT

Relates to an adjustable mounting bracket for instruments such as the conventional dial and air probe indicators and the like. The base portion of the instrument supporting bracket is formed from a one-piece flat strip metal stock cold worked into channel or C-shaped formation in cross section. The free ends of the opposing side wall sections of the channel formation are similarly inclined toward one another to form a dovetailed guideway or track upon which the instrument mounting bracket is slidably movable in opposite directions. The juncture of the side sections to the bottom transverse section are thinned to form a resiliently resisting hinge enabling one or both of the side sections to be resistingly inclined toward one another to narrow the dovetailed track and thus clamp and hold the complementary dovetailed extension forming part of the underside of the instrument supporting bracket. Improved means is incorporated into the supporting bracket for expediting manufacture and assembly and for accurately adjustably repositioning the instrument along the guideway.

2 Claims, 6 Drawing Figures

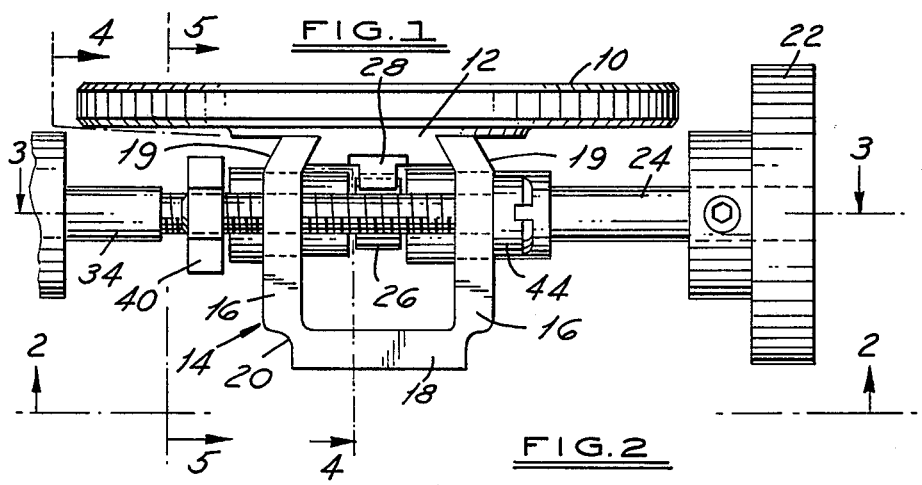
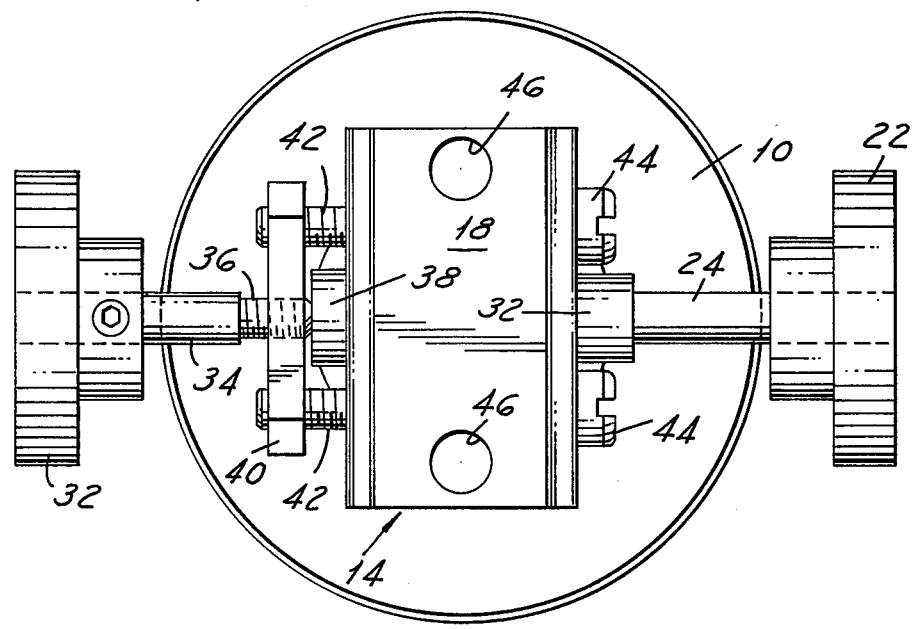

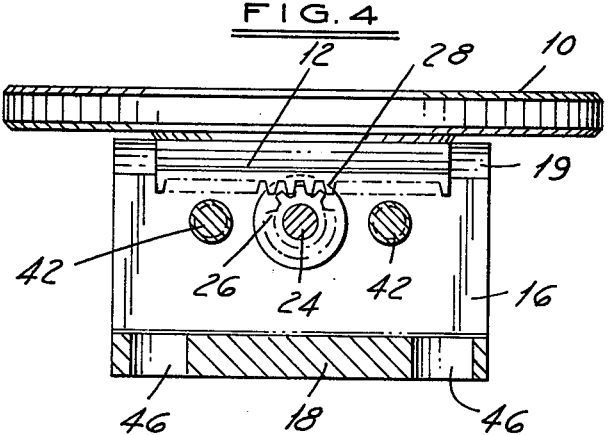
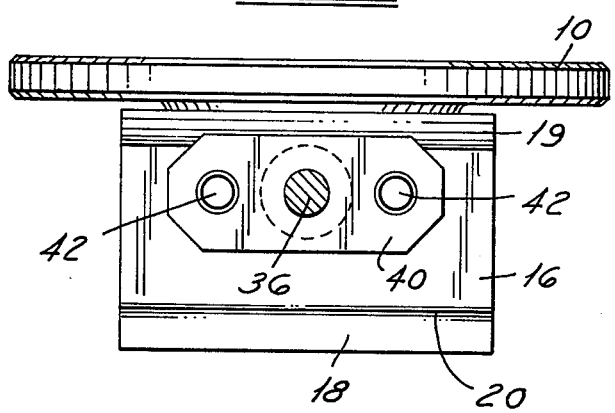
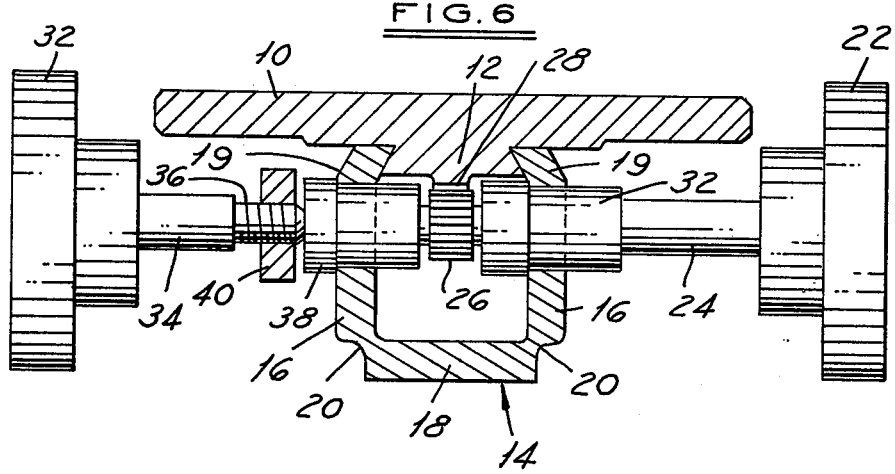

ADJUSTABLE INSTRUMENT MOUNTING BRACKET

BACKGROUND OF THE INVENTION

The present invention is an improvement over the Indicator Bracket Support disclosed in the United States patent to Melvin E. Smith U.S. Pat. No. 3,032,309. The Smith patent discloses the use of a base block formed of two separable metallic parts secured together by screws and having their confronting faces shaped to form a guideway of dovetail configuration in cross section. Received in the guideway is a depending land portion of the instrument supporting plate which is dovetailed in cross section to fit the guideway and is provided with a rack for engaging the teeth of a pinion gear carried on a rotatable shaft. The latter will rotate the pinion and act through the rack to shift the supporting plate and instruments linearly within the guideway of the base block. However, when the screws securing the two parts of the base block together are tightened, they will apply clamping pressure on the depending land portion of the instrument supporting plate and lock the plate and instrument in adjusted position in the guideway.

More remote to the kind of instrument supporting bracket disclosed in the aforesaid Smith patent is the slide locking mechanism for milling machines and the like disclosed in the U.S. Pat. to Randolph F. Bannow No. 2,831,237. The Bannow patent is directed to large machines of which the major parts are formed of heavy castings. One such cast part has an internal guide tongue which extends between the rigid walls of a guide groove and which is bifurcated in cross section and therefore transversely spreadable into gripping contact with the walls of the groove. Expansion of the bifurcated tongue for such purpose is aided by a reduction in the thickness of the cast bifurcated portions of the tongue and by the use of high leverage spreader blocks located between the bifurcated portions of the tongue and manipulated externally of the machine.

It is apparent from the description in the aforesaid patents that there is a need for an improved, economically constructed supporting bracket or mounting for an instrument which provides restrained slidable adjustment along a guideway and which utilizes parts of the guideway and the slidable connection to the instrument supporting bracket for clampingly engaging the two together to firmly hold the instrument with equally applied pressure in any adjusted position of the instrument.

SUMMARY OF THE INVENTION

Accordingly, it is an important object of the invention to provide an improved method of making an instrument mounting bracket which utilizes conventional cold working process steps for shaping a multi-plane component of the assembly from flat metal stock.

Another important object of the invention is to provide an improved instrument mounting bracket which contains a channel-shaped frame economically produced from flat metal stock which not only serves as a guideway for adjustable positioning an instrument mounted thereon but also as a clamping medium for holding the instrument in adjusted position.

A further important object of the invention is to provide an improved instrument mounting bracket which is composed of parts producible at low cost and easy to assemble and use.

In carrying out these and other objects, the invention contemplates an adjustable mounting for an instrument, such as an indicator, which is composed of a number of parts including a supporting plate for the instrument and a one-piece channel-shaped frame which serves both as a guideway along which the instrument can be adjustably positioned and also as a clamping medium for gripping the instrument supporting plate and holding it fast in any adjusted position. Significant features of the invention include the fabrication of the one-piece channel-shaped member from cold worked metal stock and the utilization of the side walls of its channel shape not only as a way or track for linearly guiding the instrument but also as a means for applying clamping pressure to hold the instrument in any adjusted position. Another feature of the invention has to do with the localized thinning of the channel-shaped frame, particularly in the region of the corners formed by the connection of the side walls of the frame to the transverse bottom of its channel configuration. Such reduction of material in the frame corners decreases the side walls' resistance to deflection thereby enabling the side walls to perform the desired clamping action on the instrument support part by elastic distortion. When freed of this clamping pressure, the inherent resiliency of the frame will return the side walls to their respective normal planes thus avoiding the addition of spring elements for this purpose.

BRIEF DESCRIPTION OF THE DRAWINGS

Various other objects, advantages, and meritorious features of the invention will become more fully apparent from the following specification, appended claims and accompanying drawing figures, wherein:

FIG. 1 is an end elevation of an adjustable instrument mounting bracket constructed in accordance with this invention in normal position for providing a guideway for slidable adjusting the instrument supporting plate therealong;

FIG. 2 is an underside view of the assembly of FIG. 1 taken along line 2—2 of FIG. 1;

FIG. 3 is a sectional view taken along line 3—3 of FIG. 1;

FIG. 4 is a sectional view taken along line 4—4 of FIG. 1;

FIG. 5 is a sectional view taken along line 5—5 of FIG. 1; and

FIG. 6 is a sectional view taken along line 6—6 of FIG. 3.

DESCRIPTION OF A PREFERRED EMBODIMENT

As described and illustrated in the above-mentioned Smith patent, the mounting bracket of the present invention is provided with an instrument supporting plate or platform 10 which as shown in FIG. 2 is circular in formation in order to support a dial type indicator (not shown) having an external casing commensurate in size with the supporting plate. Screws or other suitable fastening means may be employed to secure the dial indicator or other instrument to the plate 10. Also, like the Smith patent disclosure, the underside of the instrument supporting plate 10 is provided with a downwardly depending land portion 12 which is elongated in one dimension and dovetailed in cross section as best shown in FIGS. 1 and 6.

An important feature of the mounting bracket is the base portion which provides both a guideway for linearly moving the instrument supporting plate 10 and a clamp for locking the plate and instrument in any adjusted position along the guideway. Referring to FIGS. 1 and 6, the base portion comprises a one-piece multi-plane member generally indicated at 14 which is U or C-shaped in cross section having spaced preferably parallel side wall sections 16—16 of equal thickness joined by a transverse bottom section 18 also of the same thickness. The multi-plane member 14 is readily made in one piece from flat strip metal stock by conventional cold working processes using suitable dies especially made for such processes as punch press operations, extruding, drawing or cold rolling. Extrusion, however, does not require that the raw stock, nor elements of the finished product, be either flat or uniform in thickness. When fabricated, the C-shaped frame 14 has its two parallel sides similarly inwardly bent near their upper extremities as shown at 19 in FIGS. 1 and 6 to form a track shaped to slidably interfit with the dovetail shaped land portion 12 of the plate 10. Also, during fabrication the corners 20 formed by the side wall sections 16—16 with the bottom section 18 may be partly cut away or thinned on inside and outside radii as shown in FIGS. 1 and 6. This provides better localized pivotal flexing of the side wall sections 16—16 for the dovetail clamp locking function actuated by means to be described hereinafter.

The illustrated embodiment of the invention employs the use of two oppositely located thumb knobs, one for the adjusting function of moving the instrument supporting plate 10 along the guideway provided by the C-shaped frame member 14, and the other for performing the function of locking the instrument in adjusting position in the guideway. Referring to FIG. 3, the position adjusting knob is indicated at 22 mounted on a shaft 24 extending in a direction perpendicularly to the direction of travel on the guideway formed by the C-shaped frame 14. The shaft enters the adjacent side wall 16 of the frame and carries on its inner end a pinion gear 26 which as best shown in FIG. 4 engages the teeth of a rack 28 carried on the underside of the land portion 12 and along the centerline thereof. As illustrated in FIG. 3, pinion gear 26 has a slightly greater diameter than the shaft 24 but slightly less than a pair of similar diameter holes aligned through both side wall sections 16—16 of the frame member 14. A shouldered bushing 30 serves as a journal mount for the shaft 24 in the hole of the adjacent side wall 16. The enlarged end section of the bushing 30 is axially long enough to hold the pinion gear the correct distance from the adjusting side of the dovetail assembly.

With continued reference to FIG. 3, the clamping knob 32 is secured to the outer end of a shaft 34 which has a reduced inner threaded extension 36 abutting a shouldered bushing 38 which seats in the aligned hole in the adjacent side wall section 16. The inner reduced end of the bushing 38 is shaped to provide a circular recess of a diameter to fit the extremity of shaft 24 and has a length suitable to retain the pinion 26 central with respect to the clamping side of the C-shaped frame 14. The threaded extremity 36 of the shaft 34 extends through the center of a nut bar 40 into abutting engagement with the axial center of the bushing 38. The hole of the nut bar 40 through which the threaded section 36 of shaft 34 extends is internally threaded for threaded engagement with the threaded section 36 such that rotation in one direction will advance the shaft 34 through the nut bar toward the right in FIG. 3 until the leading end abuts the bushing 38. Continued rotation of the shaft 34 in the same direction will cause the nut bar 40 to back off from the bushing 38.

The nut bar 40 is threadedly joined to the extremity of a pair of screws 42—42 which extend through unthreaded holes in the side walls 16—16 of the C-shaped frame 14 in straddling relation to the pinion gear 26 and adjusting shaft 24 and with the heads 44—44 of the screws bearing against the outer surface of the side wall 16 on the adjusting side of the C-shaped frame. It is apparent that as the clamping screw 36 is threaded in advancing direction through the nut bar 40 while abutting the outer end of the bushing 38, it will cause the nut bar to transmit reactionary forces through the screws 42—42 to the opposite side of the C-shaped frame. Moreover, such forces will act on the C-shaped frame to deflect the side walls 16—16 about their respective thinned corners 20—20 which serve as hinge axes and draw their upper extremities toward one another and into binding engagement with the dovetailed-shaped land 12. This will firmly lock the supporting plate 10 and the instrument carried thereby in any adjusted position along the dovetail guideway. Contrariwise, it is evident that unthreading rotation of the clamping screw 36 will lessen the clamping forces previously applied until the instrument supporting plate 10 is freed for travel on the guideway. When this occurs, the pinion gear 26 is freed to be turned by the knob 22 and will slide the instrument supporting plate in one or the opposite direction along the guideway depending on the direction of rotation of the knob 22.

The hereinabove specification has described the parts of the mounting bracket in their final assembled positions. With reference to FIG. 3, it is apparent from the oversize dimensions of the shouldered portions of the bushings 32 and 38 with respect to the aligned holes in which they seat that they are introduced into their respective holes from the left as the assembly is viewed in FIG. 3. However, before the bushing 38 is seated in its side wall hole, the shaft 24 with its integrally formed pinion gear 42, and without the attachment of the knob 22 thereto, is passed from the left of FIG. 3 through the side wall hole for receiving the bushing 38 until the pinion gear 42 is brought up close to the enlarged end of the bushing 32. Thereafter, the knob 22 is fixed to the outer end of the shaft 24 and the bushing 38 is fitted into its side wall hole shown in FIG. 3. Following this step, the nut bar 40 is threadedly engaged with the extremities of the pair of screws 42—42 in the manner illustrated in FIG. 3 and the clamping screw 36 is threaded into the center hole of the nut bar. The bottom section 18 of the C-shaped frame member 14 is provided with two spaced apart holes 46—46 for admitting screws (not shown) for securing the assembly onto any type of flat base area which the user may choose to fasten it. Although it is preferred to thin the junctures of both side wall sections 16—16 to the bottom section 18 as shown in order to obtain the desired flexibility for performing the clamping operation, it may be desirable for certain usages to fabricate the C-shaped frame 14 with only one such flexible wall 16 for clamping purposes, leaving the corner of the other wall 16 unthinned and thereby making the wall relatively rigid.

While a particular embodiment of the invention has been shown and discussed, it will be understood, of course, that it is not desired that the invention be limited thereto since modifications may be made. It is, therefore, contemplated by the appended claims to cover any such modifications as fall within the true spirit and scope of the invention.

What is claimed is:

1. An adjustable instrument mounting bracket comprising, in combination:

a relatively rigid one-piece frame member of general channel-shaped formation formed from a flat strip metal stock cold worked into the channel-shaped formation, said frame member having a common edge of each of its opposing side wall sections integrally joined to the opposite side margins of its bottom section, said opposing side walls having their respective free ends similarly slanting inwardly toward one another and V-shaped to form parallel tracks of a dovetailed guideway in the space between the free ends of the opposing side walls of the frame member;

an instrument mounting part having the underside thereof shaped with V-shaped recesses the walls of which complementarily slidably receive and engage the V-shaped tracks of the dovetailed guideway formed by the channel-shaped frame member;

at least one of said two opposing sidewall sections of the channel-shaped frame member being elastically distortable out of its normal plane and toward the other side wall to decrease the width of the dovetailed guideway with the result that when the width of the dovetailed guideway is decreased in this manner it imposes sufficient clamping pressures on the dovetailed-shaped underside of the instrument mounting part to hold the instrument mounting part from movement along the dovetailed guideway;

means extending across the space between the opposing side wall sections of the channel-shaped frame member and operatively coupled thereto for elastically distorting at least one of said side wall sections out of its normal plane and toward the other side wall to vary the clamping pressure exerted by the side wall sections upon the dovetailed underside of the instrument mounting part; and the resistance of either one or both of the elastically distortable side wall sections toward the opposing side wall section being lessened by reducing the thickness of the corner formed between the bottom section and at least one of said side wall sections of the channel-shaped frame member thereby to provide a hinge axis along each such corner about which each such side wall section is elastically deflectable toward the other.

2. An adjustable instrument mounting bracket comprising, in combination:

a relatively rigid one-piece frame member of general channel-shaped formation having a common edge of each of its opposing side wall sections integrally joined to the opposite side margins of its bottom section, said opposing side wall sections having their respective free ends V-shaped to form parallel tracks of a dovetailed guideway in the space between the free ends of the opposing side wall sections of the frame member;

an instrument mounting part having the underside thereof shaped with V-shaped recesses the walls of which are complementarily angled to receive and engage the V-shaped free ends of the wall sections of the dovetailed guideway formed by the channel-shaped frame member for slidable movement therealong;

at least one of said two opposing side wall sections of the channel-shaped frame member being elastically distortable out of its normal plane and toward and into clamping engagement with the V-shaped recess into which it is received;

means incorporated in the instrument mounting bracket for applying forces against at least said one elastically distortable side wall section to deflect the free end of the same toward its respective V-shaped receiving recess thereby to exert sufficient clamping pressures on the dovetailed-shaped underside of the instrument mounting part to hold the part from movement along the dovetailed guideway;

said force applying means being provided with further means which extends across the space between the opposing side wall sections of the channel-shaped frame member and being operatively coupled thereto for elastically distorting both of said side wall sections out of their respective normal planes and toward their respective V-shaped receiving recesses to apply sufficient clamping pressures upon the dovetailed underside of the instrument mounting part to hold the same from movement along the dovetailed guideway; and the resistance of the elastically distortable side wall sections toward their respective V-shaped recesses being lessened by reducing the thickness of the corners formed between the bottom section and both of the side wall sections of the channel-shaped frame member thereby to provide hinge axes in such corners about which the free ends of the side wall sections are deflectable toward their respective receiving V-shaped recesses.

* * * * *